United States Patent
Kurzweil et al.

(10) Patent No.: US 6,754,823 B1
(45) Date of Patent: Jun. 22, 2004

(54) TECHNIQUE FOR DISTRIBUTING SOFTWARE

(75) Inventors: Raymond C. Kurzweil, Newton, MA (US); John A. Keklak, Sudbury, MA (US); Jules A. Yasuna, Upton, MA (US)

(73) Assignee: Kurzweil CyberArt Technologies, Wellesley Hills, MA (US)

( * ) Notice: Subject to any disclaimer, the term of this patent is extended or adjusted under 35 U.S.C. 154(b) by 805 days.

(21) Appl. No.: 09/695,570

(22) Filed: Oct. 24, 2000

(51) Int. Cl.⁷ .............................................. G06F 17/00
(52) U.S. Cl. .................. 713/179; 713/150; 713/153; 713/178; 713/182
(58) Field of Search .......................... 713/150–156, 713/175–182, 185–187

(56) References Cited

U.S. PATENT DOCUMENTS

| | | | |
|---|---|---|---|
| 6,681,213 B2 * | 1/2004 | Fujimori | 713/153 |
| 6,690,794 B1 * | 2/2004 | Terao et al. | 713/194 |
| 6,694,436 B1 * | 2/2004 | Audebert | 713/200 |

OTHER PUBLICATIONS

Zhou et al., 50GHz RSFQ pseudo–random number of generator design, Applied Superconductivity, IEEE Transactions on, vol. 11, Issue 1, Mar. 2001, pp. 617–620.*

Vaklii, Variance reduction for discrete event systems driven by Poisson processes, Simulation Conference Proceedings, 1995, Winter, Dec. 3–6, 1995, pp. 278–284.*

Kuo et al., Predictable timestamp under synchronized clocks in a network, Information Theory, 1994, Proceedings, 1994, IEEE International Symposium on, Jun. 27–Jul. 1, 1994, p. 68.*

* cited by examiner

*Primary Examiner*—David Jung
(74) *Attorney, Agent, or Firm*—Fish & Richardson P.C.

(57) ABSTRACT

A computer program product and method for installing downloaded software on a client system over a network is described. The product and method include generating an access key by receiving an installation key produced using a random number generated from a seed that is the value of a client system internal clock at the exact moment in time to the millisecond at which a software installation program was run on the client produce the access code by modulo combining the installation key and user name received by the client system.

15 Claims, 3 Drawing Sheets

TECHNIQUE FOR DISTRIBUTING SOFTWARE

BACKGROUND

This invention is directed to techniques to distribute software and prevent its unauthorized transfer.

It is desirable to distribute software electronically and still license it in some manner. Traditionally there were two ways of doing this licensing. One was shipping a CD with a software that required a license key. All CD's for a given product would have the same software, except for the license key that was required. This is a common way of distributing software for desktop applications. A second mechanism has a licensing software library built into the software. Both mechanisms are often used to down load software from the Internet.

One approach is a product Flex1M offered by Globetrotter. With this product a distributor buys the software, bundles the software with application software, and uses the bundled mechanism for generating keys.

SUMMARY

According to an aspect of the present invention, a method of downloading software over a network includes downloading the software and installing. Installing the software includes generating an installation key by using a random number generated from a seed that is the value of a client system internal clock at the exact moment in time to the millisecond at which the software installation program was run on the client, and producing an access code by combining the installation key and user name and performing a modulo operation on the result.

According to an additional aspect of the present invention, a computer program product residing on a computer readable medium for installing downloaded software on a client system over a network, includes instructions to cause a computer to generate an access key by receiving an installation key produced using a random number generated from a seed that is the value of a client system internal clock at the exact moment in time to the millisecond at which a software installation program was run on the client produce the access code by modulo combining the installation key and user name received by the client system.

One or more of the following advantages are provided by one or more aspects of the invention.

The invention obviates the need to ship software on a CD, allowing for a purely electronic distribution method. The invention also avoids the complexity of licensing libraries built into the software. The invention delivers software that requires a key that can only work on one computer.

BRIEF DESCRIPTION OF THE DRAWINGS

FIGS. 3A and 3B are flow charts of processes in the server of FIG. 2.

DESCRIPTION

Figure 1:
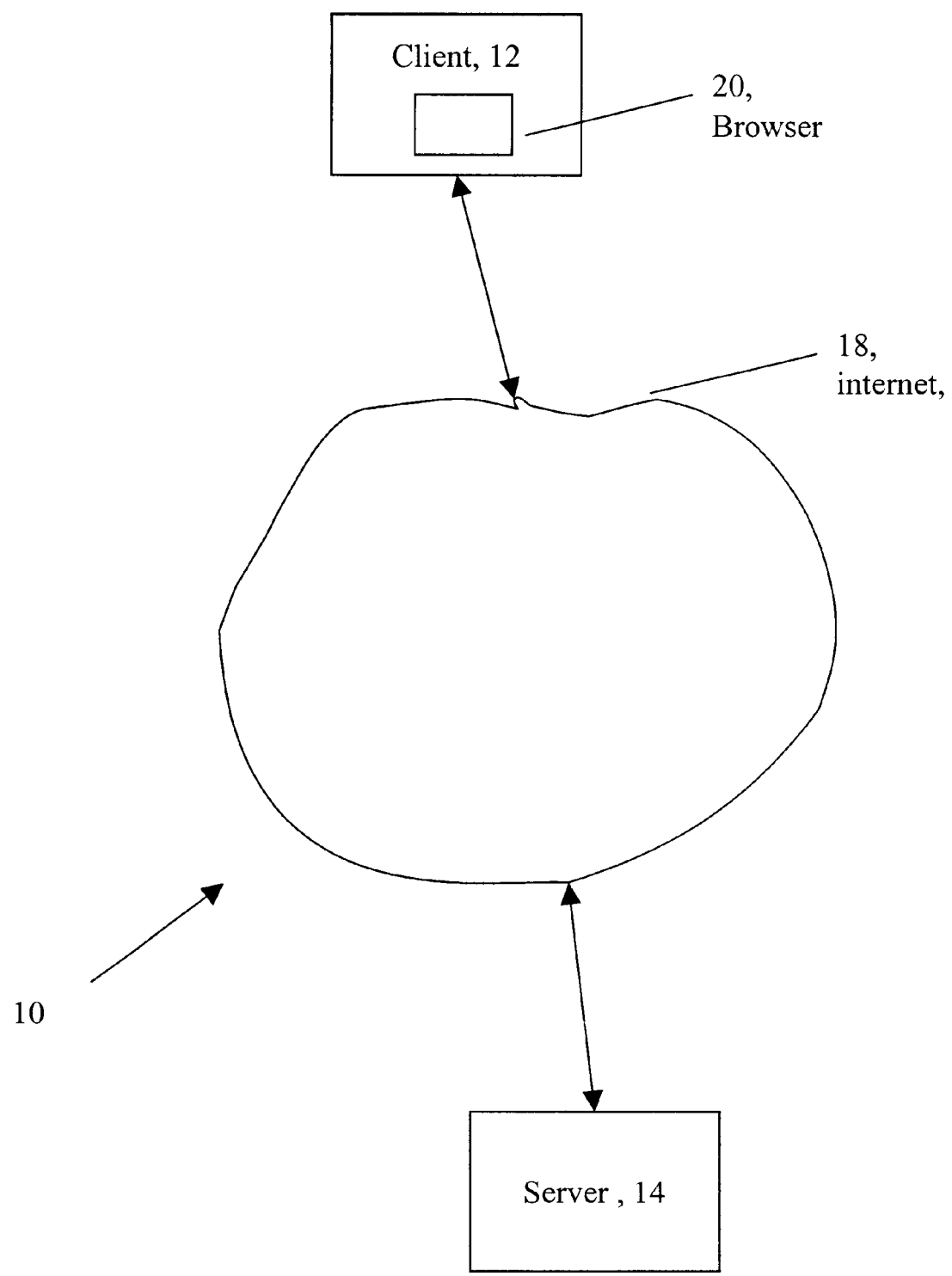
FIG. 1 is a block diagram.

Referring to FIG. 1, a networked system 10 is shown for delivery of software over, e.g., the Internet. The networked system 10 includes a client system 12 connected to a server 14, via a network, e.g., the Internet 18. The networked system 10 is implemented as a Web-style system that is used to facilitate communications between users at client computers such as client system 12 and the server 14 over the network 18. In a Web implementation, the network 18 can be the "Internet" and the server 14 a Web server. Private networks can also be used.

More particularly, a user at client system 12 surfs via a Web browser 20, to the Web server 14. At the web server 14 the client can download software. In some implementations, the software can be an application program whereas in other implementations the software can be a program such as a screen saver. In addition the software can be offered with basic features for one price, e.g., freely distributed, or can be distributed with additional optional features by having the user pay for the features with a credit card.

The Web browser 20 renders display output in the form of hypertext markup language (HTML) pages. The Web browser 20 may be any commercially available browser, such as Microsoft Internet Explorer or Netscape Navigator.

Figure 2:
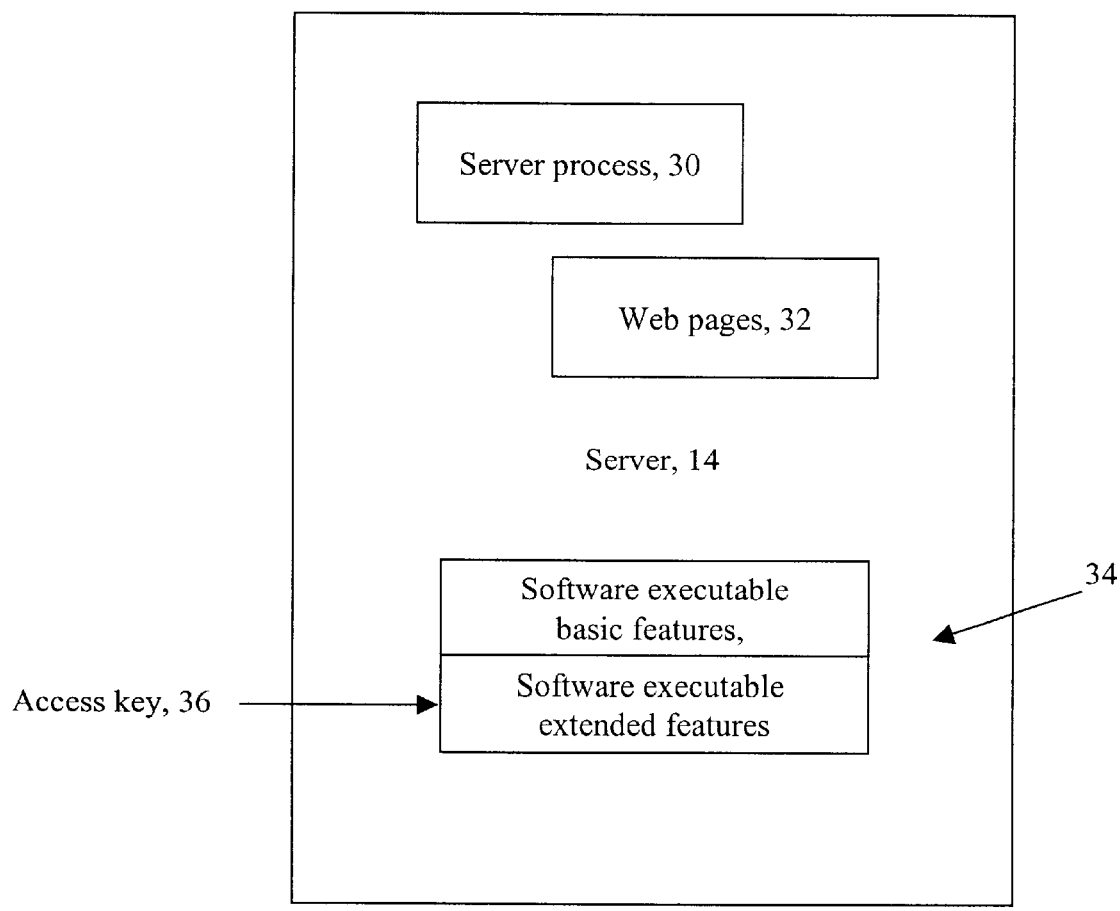
FIGS. 2, 3A and 3B are flow charts.

Referring to FIG. 2, processes that run on the server 14 are shown. The server 14 executes a server process 30. The server 14 can include a web server process, which among other functions produces web pages 32, as well as a server that executes requests for client systems. The server 14 stores information organized into distributed web pages. For example, the pages are stored as information encoded into HTML or other techniques. The manner in which the HTML and equivalent pages are produced is well known and therefore not discussed herein. The server 14 also stores the software 34 that is made available for distribution, via the Internet. The software 34 includes basic features that can be supplied for free to a user as well as features that are not activated at download unless or until a fee is paid for the additional features. The features are unlocked by an access key 36 that also makes the software fixed to one client system 12.

Figure 3A:
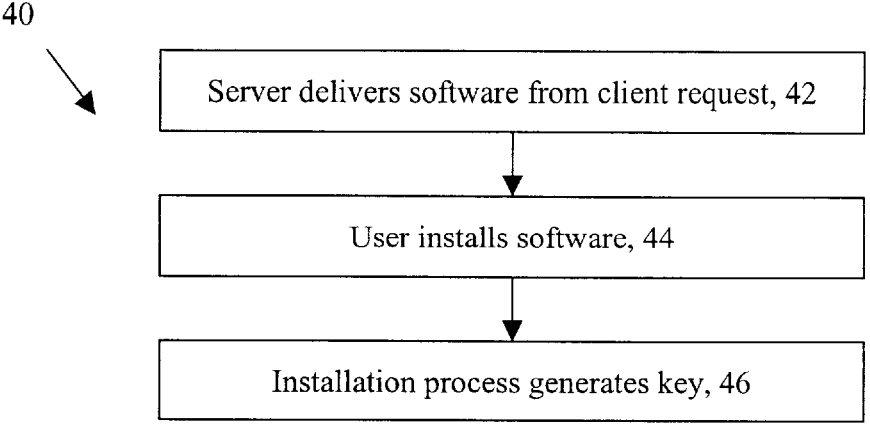

Referring to FIG. 3A, the server 14 delivers an executable of the software 34 to the client system 12 with certain features turned off. The user freely downloads this basic version of the executable from the server 14. That executable runs in "basic mode." To access premium features, which are turned off, the user enters an access key 36 (FIG. 2) through a dialog box that can pop up under any of a number of circumstances, e.g., trying to access a premium feature, as a reminder to upgrade or as an invitation to upgrade. The access key 36 is produced from information supplied by the user after or as part of upgrading the product, as described below.

When the user downloads the software 42 and runs the installation 44, the installation generates 46 an installation key, which is a piece of information that will be used to generate the access key 36. Another piece of information is the user name under which operating system registered on the client system 12. For example, with the Windows based operating systems, when a user installs Windows 2000$^R$, (Microsoft) Windows asks for an installation name. The name is stored inside the windows registry as the so called registered owner. This feature is available on Windows 95$^R$, 98$^R$, NT$^R$, and so forth. The registered name stays on the client system 12 until the operating system is changed.

The installation key is an N digit key, e.g., 12 to 16 characters that is randomly generated. The mechanism that is used to generate the N digit key is a random number generator. As known, a random number generator is only as random as the seed used to generate it. The seed used in the preferred embodiment is the value of the client system internal clock at the exact moment in time to the millisecond at which the software installation program was run on the client. If two users downloaded the software and ran the installation program at the exact moment in time (to the millisecond) they would get the same installation key. However this is highly unlikely. However, since the names on the system, i.e., the registered owner, are likely different the key that is generated is likewise different.

Figure 3B:
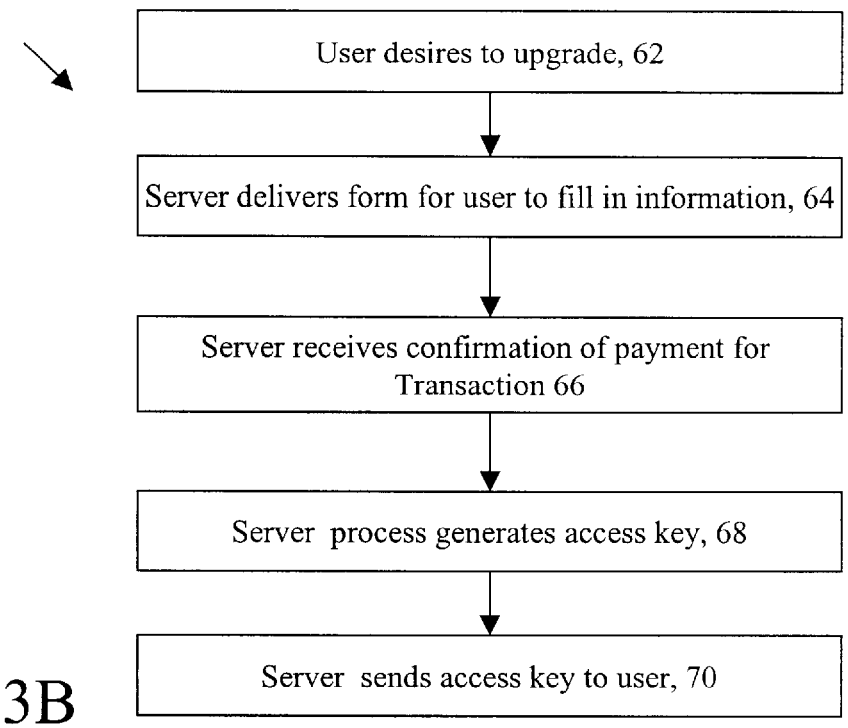

Referring to FIG. 3B, a user desires to upgrade 60 to the premium features. During upgrade 60, the user can be prompted by a dialog box to enter the access code. Initially, the user does not have the access code and instead can select an option to upgrade the basic software. The program connects the user to the server 14. The program embeds the installation key and the user name in the information that is sent to the server, e.g., website by the user.

As part of the upgrade process the user is prompted to fill in information 64, via web pages that are delivered from the server. The information includes name, e-mail address, address, demographics, and so forth, items that the distributor of the software would want for marketing etc, to be stored in a database (not shown). When the user comes to the site, the user fills in the information and supplies a credit card number for a credit card transaction. Once the distributor receives acknowledgment of the transaction 66. The server 14 receives the information from the client 12, e.g., installation key and user name, and based on the information generates 68 the access code. The access code is generated 68 based on the algorithm described below and supplied 70 to the user.

The installation key has 16 digits, the user name could have any number of digits. The process to produce the access key goes through each digit and adds the installation key and the user name digit by digit. In this implementation the installation key is always 16 digits and since the user name can be any number, the registered user name is expanded (or shrunk) to make the length of the registered user be the same as the length of the installation key, e.g., 16 digits. That is, if the registered user length is greater than 16 digits, everything after the 16th digit is simply discarded. Conversely, if the registered user length is less than 16 digits, the string is recycled.

For example, if the registered user is "Fred Smith". This string is expanded to "Fred SmithFred S" (16 digits including spaces). With the two strings (the installation key & the registered user), which are both 16 digits, the algorithm adds the two strings, digit by digit. For example, given an installation code of abcdefghijklmnop and a registered user of "Fred Flintstone", the algorithm adds each digit ("a"+"F"; "b"+"r"; "c"+"e"; "d"+"d"; and so on . . . ) to get an array of numbers. The array of numbers is 16 digits in length. Each number in the array is converted back to a letter by applying mathematical "modulo" operations. In this case, (number) MODULO 48, since 48 is the ascii representation of the letter "a."

The upgrade process 60 generates the access key 68 and sends 70 the access key back to the person via two methods. One method used to return the key to the user is to display the key in the Web browser so that the user can cut and paste it back into the dialog box that was opened when the user initially decided to upgrade. The distributor will also send an e-mail to the e-mail address supplied by the user. The e-mail will include the key that is placed in the Windows registry, or elsewhere.

In order to execute the software, the software retrieves the name of the registered owner and the generated installation code, which are stored on the client system, e.g., in the Windows registry or elsewhere, and produces the access key, which is compared to the access key entered by the user during the upgrade process. If the access codes are the same, the software executes. If they are not the same, the software does not execute, or alternatively the software can execute only in basic mode without the premium features, or a user can be prompted to upgrade.

Thus, this process combines the user ID or other identifier, e.g., a serial number of a processor or a hard drive with a customized installation key to lock the downloaded software to a particular machine.

Other embodiments are within the scope of the appended claims.

What is claimed is:

1. A method of downloading software over a network comprises:

downloading the software and installing, the software including generating an installation key by using a random number generated from a seed that is the value of a client system internal clock at which the software installation program was run on the client; and producing an access code by combining the installation key and user attribute; and performing an arithmetic operation on the result.

2. The method of claim 1 wherein producing the access code comprises:

adding the installation key to the user name on a digit by digit basis.

3. The method of claim 1 wherein the arithmetic operation is an operation based on an ASCII code.

4. The method of claim 3 wherein the arithmetic operation is a "modulo 48" operation.

5. The method of claim 1 wherein the client system internal clock is time to the millisecond.

6. The method of claim 1 wherein producing an access code uses a user name as the user attribute.

7. The method of claim 1 wherein performing an arithmetic operation uses a modulo arithmetic operation.

8. A computer program product residing on a computer readable medium for installing downloaded software on a client system over a network comprises instructions to cause a computer to:

generate an access key by receiving an installation key produced using a random number generated from a seed that is the value of a client system internal clock at the moment at which a software installation program was run on the client; and produce the access code by arithmetically combining the installation key and a user attribute received by the client system.

9. The computer program product of claim 8 wherein instructions to produce the access code comprise instructions to:

add the installation key to the user name on a digit by digit basis.

10. The computer program product of claim 8 wherein the arithmetic operation is an operation based on an ASCII code.

11. The computer program product of claim 10 wherein the arithmetic operation is a "modulo 48" operation.

12. The computer program product of claim 8 further comprising instructions to cause the computer to:

send the access code back to the client system.

13. The computer program product of claim 8 wherein the client system internal clock is time measured to at least the millisecond.

14. The computer program product of claim 8 wherein instructions to produce an access code use a user name as the user attribute.

15. The computer program product of claim 8 wherein instructions to perform an arithmetic operation use a modulo arithmetic operation.

* * * * *